United States Patent [19]
Veazey et al.

[11] Patent Number: 4,690,984
[45] Date of Patent: Sep. 1, 1987

[54] METAL COMPLEXES OF POLY(ALLOOCIMENE)

[75] Inventors: Richard L. Veazey, East Windsor; Mark S. Pavlin, Lawrenceville, both of N.J.

[73] Assignee: Union Camp Corporation, Wayne, N.J.

[21] Appl. No.: 934,729

[22] Filed: Nov. 25, 1986

[51] Int. Cl.$^4$ ............................................. C08F 8/42
[52] U.S. Cl. ............................ 525/332.3; 525/331.9; 525/366; 525/367; 525/370; 525/371; 526/290; 526/340.3
[58] Field of Search ................ 525/331.9, 332.3; 526/290, 340.3

[56] References Cited
U.S. PATENT DOCUMENTS

| | | | |
|---|---|---|---|
| 2,406,575 | 8/1946 | Young et al. | 525/331.9 |
| 3,278,641 | 10/1966 | Bell, Jr. | 526/340.3 |
| 3,373,149 | 3/1968 | Doyle, Jr. | 528/393 |
| 3,715,341 | 2/1973 | Velzmann | 528/374 |
| 3,929,850 | 12/1975 | Streck et al. | 526/279 |
| 3,939,131 | 2/1976 | Morikawa et al. | 526/308 |
| 4,169,116 | 9/1979 | Trotter et al. | 525/210 |
| 4,229,549 | 10/1980 | Usasmi et al. | 525/308 |
| 4,282,337 | 8/1981 | Roggero et al. | 525/285 |
| 4,288,359 | 9/1981 | Trotter et al. | 525/232 |
| 4,524,187 | 6/1985 | Greco et al. | 525/342 |

*Primary Examiner*—Schofer Joseph L.
*Assistant Examiner*—Bernard Lipman
*Attorney, Agent, or Firm*—Edward J. Sites

[57] ABSTRACT

Metal complexes of poly(alloocimene) having conjugated double bonds in pendant side chains, with metallic compounds are useful as electrically conductive coatings.

6 Claims, 1 Drawing Figure

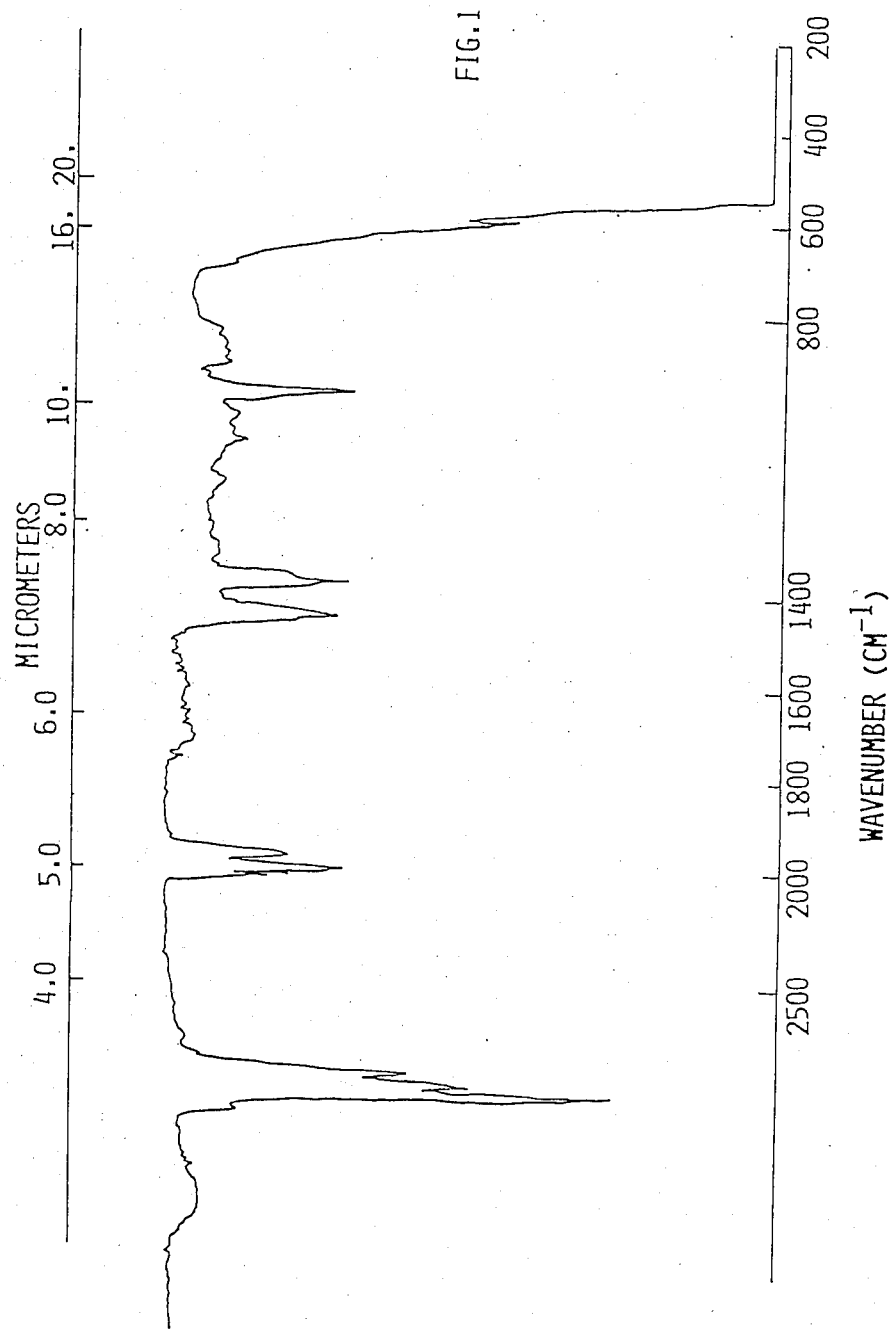

METAL COMPLEXES OF POLY(ALLOOCIMENE)

This invention relates to poly(alloocimene) and more particularly concerns metal complexes of poly(alloocimene).

BACKGROUND OF THE INVENTION

Metal complexes of organic polymers containing diene structure were described by N. Yasuda et al.; see *Macromolecules*, 17, 2453 (1984).

SUMMARY OF THE INVENTION

Adducts are disclosed which are the reaction product of a poly(alloocimene) having conjugated double bonds in pendant side chains, and a metal compound.

The adducts of the invention are useful especially in electrical applications such as conductive coatings, in filled resistor compositions and the like.

BRIEF DESCRIPTION OF THE DRAWING

FIG. 1 is an infrared spectrum of a complex of this invention.

DETAILED DESCRIPTION OF THE INVENTION

Poly(alloocimeme) polymers employed to form the complexes of this invention has conjugated double bonds in pendant side chains and are comprised of polymeric mixtures of chain units of the formulae:

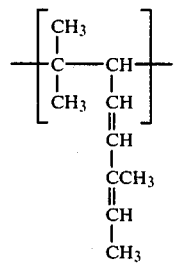
(I)

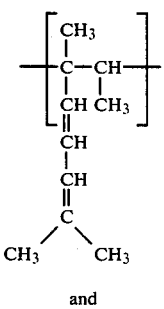
(II)

and

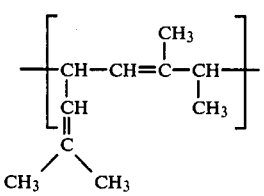
(III)

These poly(alloocimene) polymers comprise mixtures of a majority of chain moieties I and II as a group and a minority of chain moiety III. We define this poly(alloocimene) mixture as a composition consisting of greater than 50 weight percent of 2,3-poly(alloocimene), (I), and 6,7-poly(alloocimene), (II), and less than 50 weight percent of 4,7-poly(alloocimene), (III).

The 2,3- and 6,7-poly(alloocimene) may be prepared in the following manner. Substantially anhydrous alloocimene is added slowly to catalyst system comprised of an active metal catalyst dispersed in a substantially anhydrous ether component under an inert gas atmosphere. Controlled reaction by slow alloocimene addition is necessary because the polymerization is highly exothermic. It is preferred that the alloocimene feed be essentially free of peroxides, water, and alcohols. The metal catalyst component may be any alkali metal or calcium, substantially free of surface oxides or other contaminants and being present at a concentration of less than about 10 mole percent of the alloocimene. The metal catalyst component may be present as spheres, wire, foil, or finely divided dispersion and may be in the pure state, as a mixture or an alloy, or as a solution with aromatic hydrocarbons, such as naphthalene, 2-methylnaphthalene, and the like.

The ether components used in the polymerization are the aliphatic and cycloaliphatic ethers. The ethers are preferred in amounts of greater than about 5 weight percent of the alloocimene. The diluents most preferred are tetrahydrofuran and 1,2-dimethoxyethane. Inert hydrocarbon solvents and diluents may also be present, for example, benzene, toluene, xylene, ethylbenzene, pentane, hexane, cyclohexane, heptane, octane, nonane, limonene, p-cymene, and the like, or mixtures thereof.

The polymerizations may be carried out at temperatures of from about $-78°$ C. to about $100°$ C., with reaction times of from about 10 minutes to about 500 hours. Most preferably the polymerizations are carried out at temperatures of from about $-30°$ C. to about $60°$ C., with reaction times of from about 1 to about 8 hours.

When the polymerization is complete, addition of a proton source, for example, water, an acid, an alcohol, or mixtures thereof, in molar excess of the alkali metal catalysts terminates the reaction and thereby introduces hydrogen atoms at the end or ends of the polymeric chain.

Following the polymerization, the reaction mixture containing the poly(alloocimene) is subjected to distillation to remove the ether solvent, unreacted reagent. Care must be taken not to exceed a temperature of about $150°$ C. in the distillation pot containing the polymer, otherwise excessive thermal degradation of the polymer will occur. The polymer may be discharged while still molten onto a polytetrafluorethylene coated glass fabric or other suitable surface and allowed to cool. The cooled polymer may then be packaged under a nitrogen atmosphere to protect it from oxidation.

A second polymer isolation procedure, although not requisite, may be employed especially for higher molecular weight poly(alloocimene). This method involves cautious transfer of the terminally active polymer and diluents into a large excess of a nonsolvent, such as methanol, or the like. The poly(alloocimene) precipitates as a white solid. Collecting, redissolving, and reprecipitating the poly(alloocimene) solid several times gives, after finally drying, a poly(alloocimene) free of low molecular weight impurities. The dried, isolated poly(alloocimene) is then packaged and stored in a nitrogen atmosphere.

It is advantageous to add an antioxidant, such as 2,6-di-tert-butyl-4-methylphenol or the like, prior to distillative isolation, or in the final precipitation solvent to protect the poly(alloocimene) from oxidizing.

Alternatively, the poly(alloocimene) need not be isolated, but the reaction mixture containing the polymer may be used directly to prepare the adducts of the invention.

The poly(alloocimene) employed to prepare the complexes of this invention is advantageously the homopolymer of alloocimene having a weight average molecular weight of from about 500 to 100,000 and which contains repeating or recurring chain moieties of the formulae (I), (II) and (III) given above.

The metallic compounds used to prepare complexes of the invention are well known compounds as are the methods of their preparation. The metal carboxyls are the preferred metallic compounds used to prepare the metal complexes of this invention. Representative of such compounds are transition metal carbonyls such as iron pentacarbonyl, cobalt tetracarbonyl, manganese pentacarbonyl, nickel tetracarbonyl, vanadium hexacarbonyl, ruthenium pentacarbonyl, and the like.

The complexes of the invention may be prepared by simple admixture of the polymer with the metallic compound in a suitable vessel. Although ambient temperatures and pressures may be used to carry out the reaction, heating of the reaction mixture will speed the reaction to completion. Preferably, heating to a temperature within the range of from about 50° to 200° C. is employed; most preferably circa 100° C.

The progress of the reaction may be followed by conventional analytical technique. For example, infrared analysis will show the carbonyl bonds in the product when the organometallic compound reagent is iron pentacarbonyl, indicating a polymeric adduct containing chain moieties of the formula:

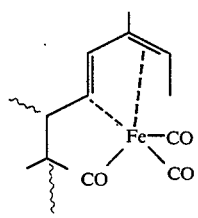

Upon completion of the reaction, the product may be distilled to remove solvent and excess metallic compound and to obtain the complexes of the invention. These may be further purified by, for example, column chromatography.

The following examples describe the manner and the process of making and using the invention and set forth the best mode contemplated by the inventors for carrying out the invention.

Preparation 1

To a clean, oven-dried, four-neck, round-bottom flask equipped with a thermometer, nitrogen inlet, pressure equalizing addition funnel, a reflux condenser into which was inserted an inert gas exit adapter, and a Nicrome wire stirrer, was added sodium shot (46 g) and toluene (300 ml) which had been dried and distilled from calcium hydride. A nitrogen blanket was maintained in the reaction flask at all times. Heat was applied and stirring initiated. The toluene was allowed to gently reflux for 30 minutes, and then it is cooled. At this point tetrahydrofuran (250 ml) was added. A preweighed sample of the alloocimene (1242 g, 44.5% true) which had been dried over calcium hydride and distilled, was charged to the addition funnel. The polymerization temperature of 75° C. was maintained by applying a dry ice isopropanol batch regulated by a temperature sensing device. Polymerization was initiated by slowly adding the alloocimene mixture over one hour to the stirred solvent containing sodium metal. After 4.5 hours, the polymerization was complete, and the poly(alloocimene) was isolated by transferring the polymer solution into a separatory funnel containing methanol. After deactivation of the catalyst, water and toluene were added, and the polymer solution was thoroughly washed with water. The organic solution was then dried over anhydrous magnesium sulfate and filtered into a round-bottom flask. The solvent(s) was removed at reduced pressures. Any monoterpenes were isolated at approximately 65° C. (5 to 22 mm Hg.). The distillation was terminated when the temperature in the pot containing the polymer product reached about 150° C. The polymer was poured while hot into a pan, allowed to cool, then stored under nitrogen. The polymer yield was 402 g, about 73% of theory. Properties of the material are reported in Table 1.

Preparation 2

The procedure of Preparation 1 was repeated except 1246 ml of previously dried toluene, 7.6 g (0.33 moles) of sodium, 233 ml of 1,2-dimethoxyethane, and 1215 ml of 95% alloocimene (7.245 moles) were utilized at a polymerization temperature of 17°-23° C. The yield was 83.6 weight percent. Other properties of this polymer are reported in Table 1.

TABLE 1

|  | Preparation 1 | Preparation 2 |
| --- | --- | --- |
| GPC |  |  |
| $M_w$ | 5201 | 29207 |
| $M_n$ | 1422 | 9800 |
| $M_w/M_n$ | 3.66 | 2.98 |
| Tg° C. | 20 | 60 |
| UV unit | 13000 | 14000 |

EXAMPLE 1

Sodium poly(alloocimene) (10 g) from Preparation 1, supra. was weighed into a 50 ml round-bottom flask equipped with a thermometer, thermowatch, and a condenser. Iron pentacarbonyl (14.4 g, 9.67 ml) was added to the flask. The mixture was magnetically stirred and heated at 100° C. for 7 hours. The condenser was removed and replaced with a distillation head, and excess iron pentacarbonyl was distilled under atmospheric pressure, leaving 11.25 g of an adduct.

The IR spectrum is presented in FIG. 1. It shows the expected carbonyl bonds at 1970-2030 cm$^{-1}$.

EXAMPLE 2

Sodium poly(alloocimene) 1.1 g. (0.0081 moles) of Preparation 2 were mixed together with 1.0 g. (0.0016 moles) of triruthenium dodecacarbonyl in 50 ml of anhydrous toluene under oxygen and moisture free conditions in a clean, oven dried 100 ml 2-necked round-bottom flask equipped with a reflux condenser, magnetic stirring bar, and a thermometer. The temperature of the reaction mixture was maintained at 90° C. for 21 hours and 15 minutes.

The products were isolated by filtering off some unreacted starting material and concentrating the filtrate to about 10 ml by distillation at reduced pressures and 40°–60° C. The filtrate was chromatographed on neutral alumina. One band eluted with heptane (0.1 g.) and showed the presence of metal carbonyl absorptions in its infrared spectrum. A second, and last, band (0.3 g.) eluted with an eluent composed of 95% volume toluene and 5% methanol. The infrared spectrum of this second material exhibited a strong metal carbonyl band. The material itself was a brittle resin with a melting point of 88° C.

What is claimed is:

1. A metal complex of 2,3- and 6,7-poly(alloocimene) and a metallic compound.

2. The metal complex of claim 1 wherein the poly(alloocimene) comprises polymer chain units which are a mixture of greater than 50 weight percent 2,3- and 6,7-poly(alloocimene) and less than 50 weight percent 4,7-poly(alloocimene).

3. The metal complex of claim 2 wherein the metallic compound is complexed with the conjugated double bond in the side chain of the poly(alloocimene).

4. The metal complex of claim 3 wherein the metallic compound is iron pentacarbonyl.

5. The metal complex of claim 3 wherein the metallic compound is triruthenium dodecacarbonyl.

6. The metal complex of claim 3 wherein the metallic compound is indium trichloride.

* * * * *